(12) United States Patent
Yang

(10) Patent No.: US 8,944,392 B2
(45) Date of Patent: Feb. 3, 2015

(54) ROTATABLE MULTI-CUP SUCTION DEVICE

(71) Applicant: Universal Trim Supply Co., Ltd., New Taipei (TW)

(72) Inventor: Shih-Sheng Yang, New Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 14/079,654

(22) Filed: Nov. 14, 2013

(65) Prior Publication Data

US 2014/0158842 A1    Jun. 12, 2014

(30) Foreign Application Priority Data

Dec. 7, 2012  (CN) .......................... 2012 1 0524693

(51) Int. Cl.
| A45D 42/14 | (2006.01) |
| F16B 47/00 | (2006.01) |
| F16M 11/04 | (2006.01) |
| F16M 11/14 | (2006.01) |
| F16M 13/00 | (2006.01) |
| F16M 13/02 | (2006.01) |

(52) U.S. Cl.
CPC ............. *F16M 11/041* (2013.01); *F16M 11/14* (2013.01); *F16M 13/00* (2013.01); *F16M 13/022* (2013.01)
USPC .................. 248/206.4; 248/205.5; 248/206.3; 248/362; 248/363; 248/537

(58) Field of Classification Search
CPC .......... A47K 5/02; F16M 13/02; F16B 47/00; A45D 20/12; A45D 2020/126; A45D 42/14; A47B 96/02; A47B 96/061; B60R 2011/0056; B60R 2011/0026
USPC .......... 248/205.5, 206.2, 206.3, 205.6, 205.8, 248/206.4, 205.7, 362, 363, 467, 537
See application file for complete search history.

(56) References Cited

U.S. PATENT DOCUMENTS

| 6,966,530 | B2 * | 11/2005 | Hsu ............................ 248/206.2 |
| 8,302,920 | B2 * | 11/2012 | Tsai ........................... 248/206.3 |
| 2007/0200037 | A1 * | 8/2007 | Nan ........................... 248/205.5 |
| 2008/0116337 | A1 * | 5/2008 | Kaneda et al. ............. 248/205.8 |
| 2009/0189033 | A1 * | 7/2009 | Lin ............................. 248/205.5 |
| 2012/0006952 | A1 * | 1/2012 | Tsai ........................... 248/206.3 |
| 2012/0018599 | A1 * | 1/2012 | Tsai ........................... 248/206.3 |

* cited by examiner

*Primary Examiner* — Nkeisha Smith
(74) *Attorney, Agent, or Firm* — Leong C. Lei

(57) ABSTRACT

A rotatable multi-cup suction device includes at least two suction cup assemblies coupled to each other through a rotatable connection assembly and each including a cup body that is in direct contact with an adhered surface of an object. The cup bodies are each provided with a cap positioned thereon to define a cavity with the cup body. Each of the cup bodies includes a coupling screw rod and each of the caps includes a mounting hole formed in a central portion thereof to receive the coupling screw rod to extend therethrough. Each of the caps is provided, on a top thereof, with a rotary knob that is threadingly coupled to the coupling screw rod and is provided with an air evacuation hole that is connectable to an air evacuation device. Each of the coupling screw rod has a distal end extending beyond an end face of the rotary knob.

1 Claim, 3 Drawing Sheets

ROTATABLE MULTI-CUP SUCTION DEVICE (a) Technical Field of the Invention

The present invention generally relates to the field of suction cups, and more particularly to a rotatable multi-cup suction device.

(b) Description of the Prior Art

In the modern technology, a suction cup is used to affix, through a suction force, to an adhered surface. The use is convenient and is thus widely used by general people. However, heretofore, a suction device is generally of a single-cup structure that uses a single suction cup to affix and suspend an object on a wall, a door/window, or a car windshield. On the other hand, some products, such as a car-carrying satellite navigation device, are mounted to a suction device through a clamp. This makes it not rotatable in a 360-degree manner. In addition, the use and operation of the clamp is generally complicated and inconvenient. Further, each of different specifications of satellite navigation device must be provided with a specific clamp, making the adaptability of such clamps very poor.

SUMMARY OF THE INVENTION

An object of the present invention is to overcome the deficiency of the state of the art by providing a rotatable multi-cup suction device, wherein one of the multiple suction cups can be affixed to an adhered surface and another one affixed to an object or a device to be sucked and the suction device is structured to rotate and is thus convenient to use. In addition, each of the suction cups can support a great load, has an extended life span, and is allowed for multiple times of repeated use.

To achieve the above object, the present invention is realized with the following technical solution:

The present invention provides a rotatable multi-cup suction device, which comprises at least two suction cup assemblies. The suction cup assemblies are coupled to each other through a rotatable connection assembly. The suction cup assemblies each comprise a cup body that is directly contactable with an adhered surface of an object. The cup bodies are each provided with a cap positioned thereon to define a cavity with the cup body. Each of the cup bodies comprises a coupling screw rod. Each of the caps comprises a mounting hole formed in a central portion thereof to receive the coupling screw rod to extend therethrough. Each of the caps is provided, on a top thereof, with a rotary knob that is threadingly coupled to the coupling screw rod. Each of the cup bodies is provided with an air evacuation hole that is communicateable with an air evacuation device. Each of the coupling screw rod has a distal end of which a length extends beyond an end face of the rotary knob.

Further, each of the cup bodies has a bottom in which a full turn of an annular groove is formed and each of the cup bodies has a top on which a raised curved wall that defines therein a cavity is formed so that the cavity defined by the raised curved wall is in communication with a cavity defined in the bottom annular groove. The air evacuation holes are arranged on the raised curved walls, respectively. The raised curved walls help spread the force that the object applies to the suction cup so as to provide the suction cup with an increased capability of loading.

In the present invention, the suction cup assemblies can be of a number of two, comprising a first suction cup assembly and a second suction cup assembly. The rotatable connection assembly comprises a sphere and a spherical socket that mates and is rotatably coupled to the sphere. The sphere is connected to the distal end of the coupling screw rod of the first suction cup assembly. The spherical socket is connected to the distal end of the coupling screw rod of the second suction cup assembly.

As a further technical improvement, the distal end of the coupling screw rod of the first suction cup assembly is provided with a pin hole extending therethrough. The sphere is provided with a bore for fitting the sphere to the distal end of the coupling screw rod and a pin hole. The two pin holes are alignable with each other to receive a pin to extend therethrough so as to connect the sphere to the coupling screw rod of the first suction cup assembly. The spherical socket comprises a first spherical socket member that is coupled to the distal end threading of the coupling screw rod of the second suction cup assembly and a second spherical socket member that is fit over an outer circumference of the first spherical socket member. The first spherical socket member has a front end forming an external thread and the second spherical socket member has a rear end forming therein an internal thread so that the first spherical socket member and the second spherical socket member are threadingly coupled to each other, whereby the first spherical socket member, when mating and coupled to the second spherical socket member, defines therein a cavity having an inside surface that is a spherical surface.

In the present invention, to facilitate the operation of molding and manufacturing, the support rods are integrally formed with the caps, respectively, through injection molding and the coupling screw rods are integrally formed with the cup bodies, respectively, through injection molding.

The cup bodies are made of a plastic material that shows adhering properties.

The caps are of a hemispherical form.

Compared to the prior art, the present invention provides the following advantages:

(1) The present invention provide a suction device having a structure made to include multiple suction cups so that to use, one of the suction cups is affixed to an adhered surface, while another suction cup directly sucks and holds a product or a device in such a way to allow the sucked and held product or device to freely rotate for a range of 360 degrees, making the applicability wide and adaptability excellent. For example, for in-car applications, one of the suction cups can be affixed to a windshield, while the other one of the suction cups is affixed to and holds a satellite navigation device so that satellite navigation device is allowed to rotate to any desired orientation, making the use and operation easy and convenient, and allowing the suction cup to be affixed to numerous devices having various specifications and sizes without providing a specific cup for each of the devices, whereby, compared to the prior art devices, the adaptability is excellent and the applicability is wide.

(2) In the present invention, a cavity is formed between a cup body and a cap, so that when a rotary knob is rotated and lifted up, the cavity between the cup body and the cap induces a negative pressure therein so as to further induce a negative pressure between a bottom surface of the cup body and the adhered surface to provide an improved effect of suction and holding.

(3) The present invention is operated by applying an air evacuation device achieve negative pressure inside the interior cavity of the cup body through air evacuation, whereby dual negative pressure cavities are formed to greatly increase the loading capacity of the suction cup.

(4) The suction device of the present invention are repeatedly usable for numerous times, has an extended life span, is not affected by the surrounding temperature and humidity, and shows excellent adaptability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
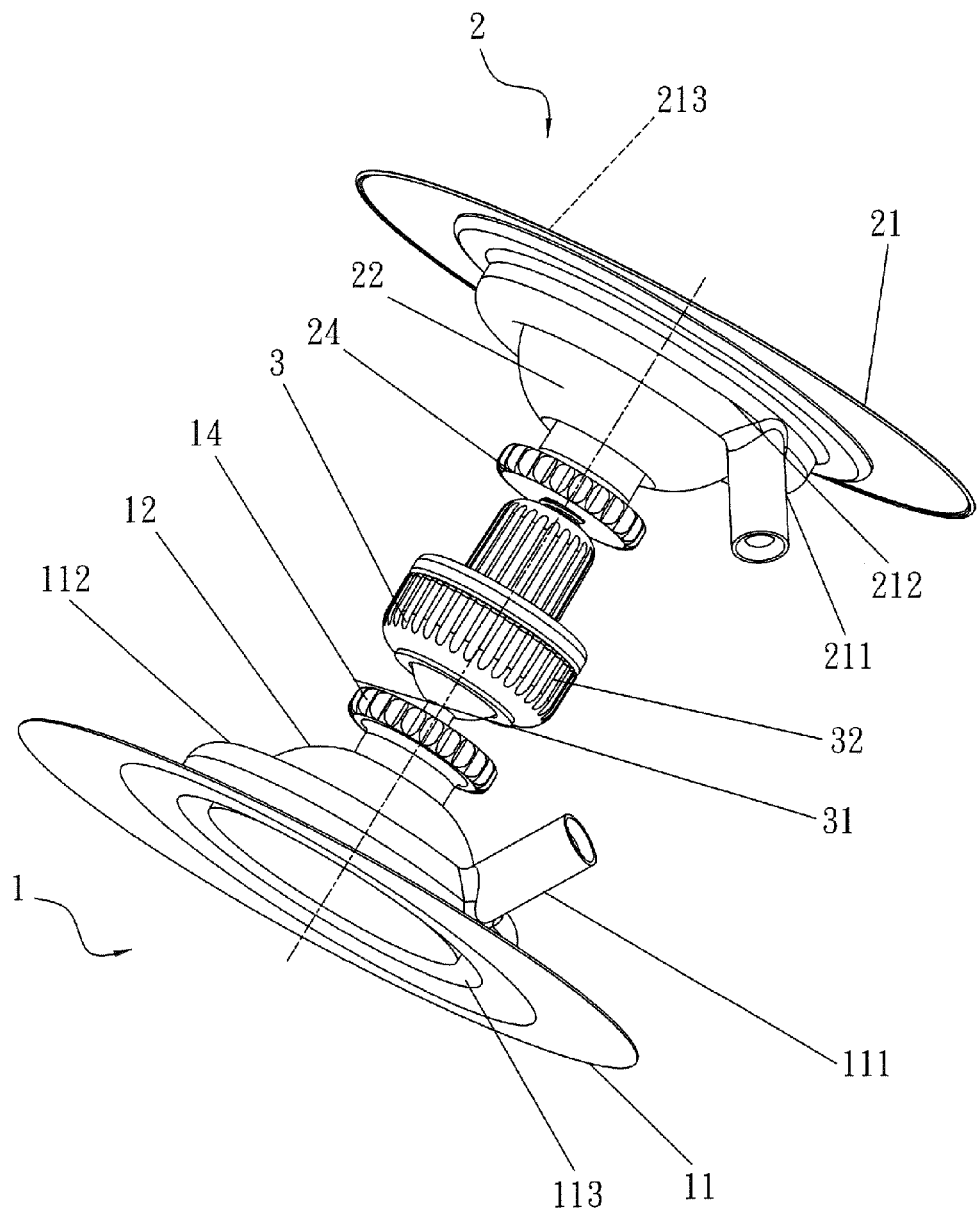
FIG. 1 is a perspective view showing a rotatable multi-cup suction device according to the present invention.

As shown in FIG. 1, the present invention provides a rotatable multi-cup suction device, which comprises two suction cup assemblies 1, 2, which are specifically a first suction cup assembly 1 and a second suction cup assembly 2. The suction cup assemblies are connected to each other by a rotatable connection assembly 3.

Figure 2:
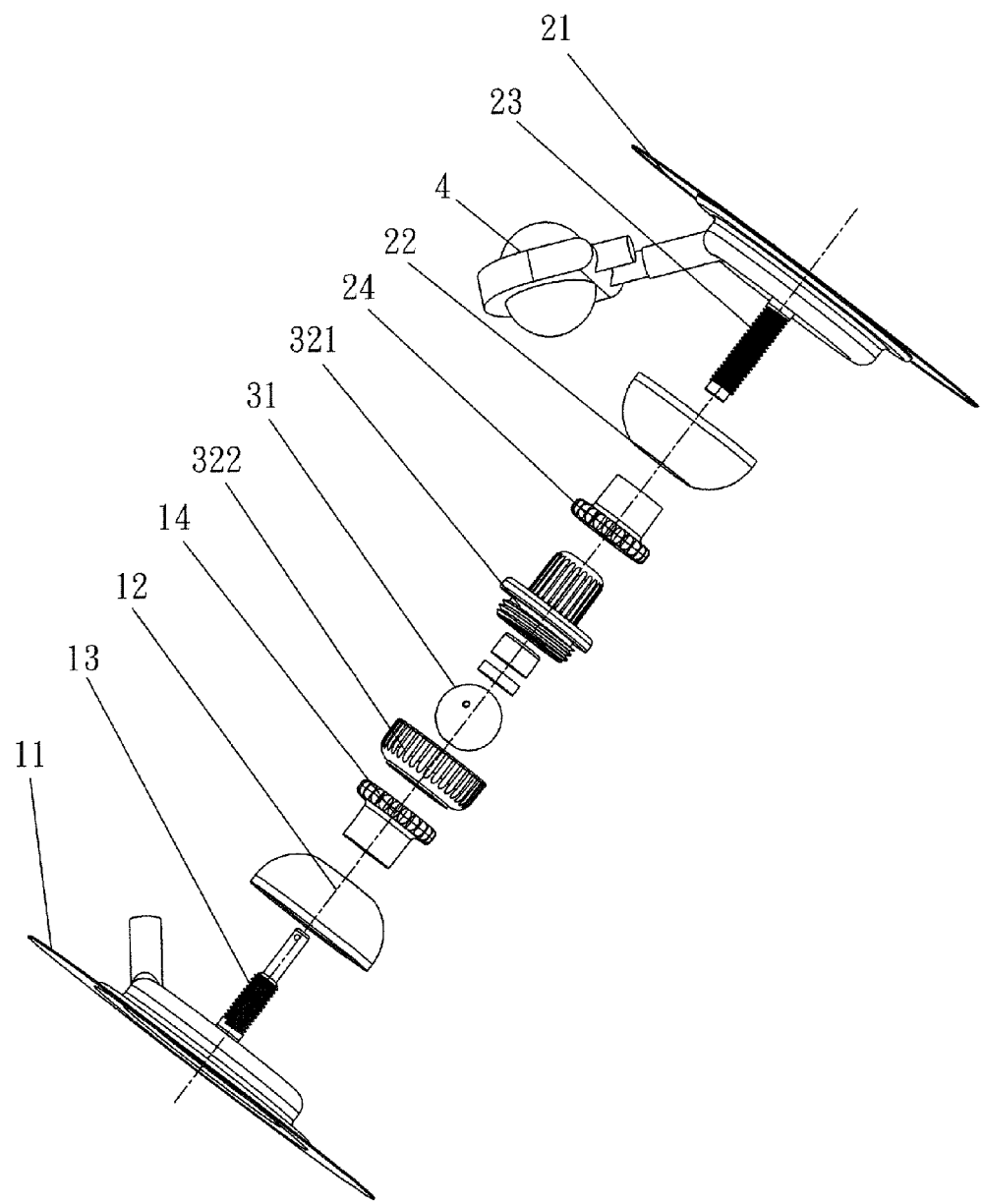
FIG. 2 is an exploded view showing the rotatable multi-cup suction device according to the present invention.
Figure 3:
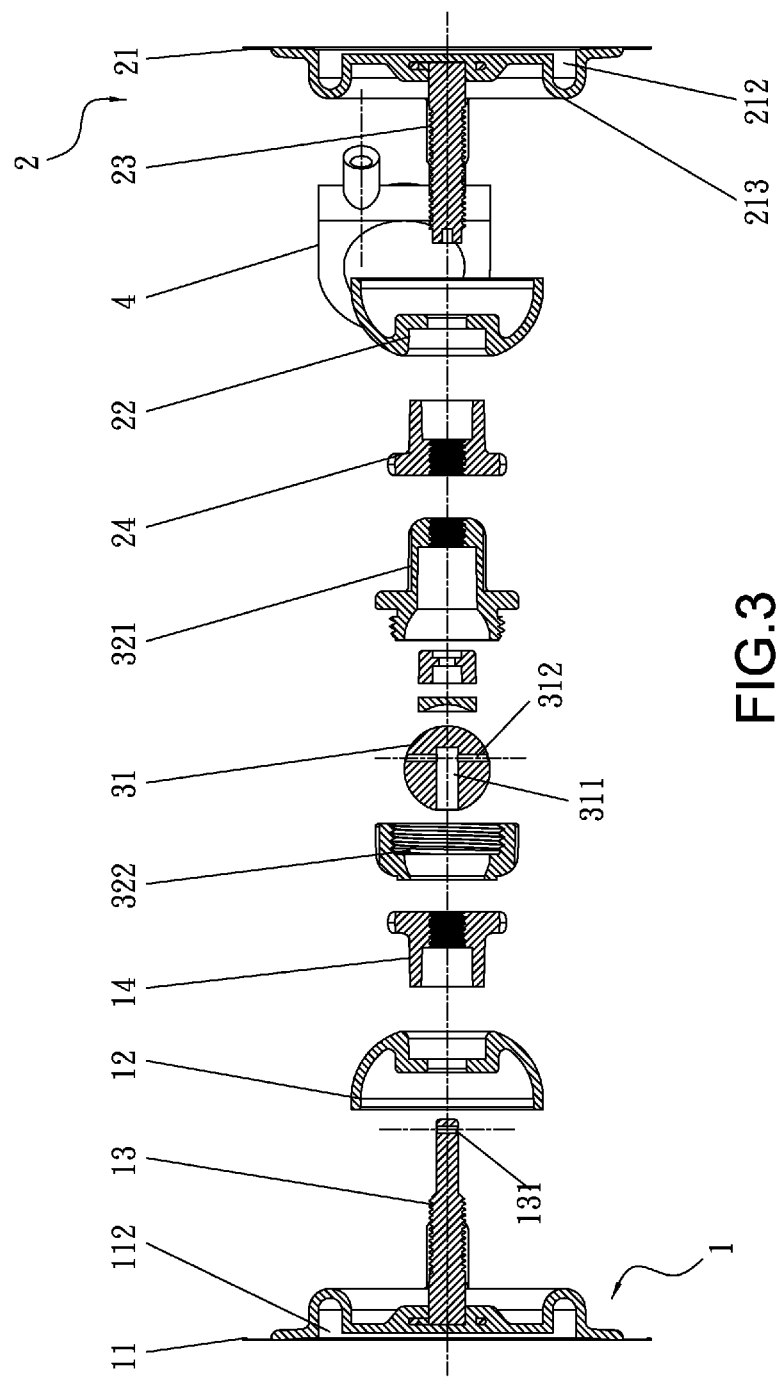
FIG. 3 is an exploded view, in a sectioned form, showing the rotatable multi-cup suction device according to the present invention.

As shown in FIGS. 2 and 3, each of the suction cup assemblies 1, 2 comprises a cup body 11, 21 that is directly contactable with an affixed surface.

The cup bodies 11, 21 are each provided with a cap 12, 22 positioned thereon to define a cavity with the cup body 11, 21. Each of the cup bodies 11, 21 comprises a coupling screw rod 13, 23 and each of the caps 12, 22 comprises a mounting hole formed in a central portion thereof to receive the coupling screw rod 13, 23 to extend therethrough. The cap 12, 22 is provided, on a top thereof, with a rotary knob 14, 24 that is threadingly coupled to the coupling screw rod. Each of the cup bodies 11, 21 is provided with an air evacuation hole 111, 211 that is communicateable with an air evacuation device 4. Each of the coupling screw rod 13, 23 has a distal end of which a length extends beyond an end face of the rotary knob 14, 24. Further, each of the cup bodies 11, 21 has a bottom in which a full turn of an annular groove 112, 212 is formed and each of the cup bodies 11, 21 has a top on which a raised curved wall 113, 213 that defines therein a cavity is formed so that the cavity defined by the raised curved wall 113, 213 is in communication with a cavity defined in the bottom annular groove 112, 212. The air evacuation holes 111, 211 are arranged on the raised curved walls 113, 213, respectively. The coupling screw rods 13, 23 are preferably integrally formed with the cup bodies 1, 2 through injection molding. The cup bodies 1, 2 are made of a plastic material that shows adhering properties. The caps 12, 22 are preferably of a hemispherical form.

FIGS. 2 and 3 show that the first suction cup assembly 1 and the second suction cup assembly 2 are of substantially identical structures and a difference is that the two coupling screw rod 13, 23 are of different structures.

In the present invention, the rotatable connection assembly 3 that connects the two suction cup assemblies 1, 2 comprises a sphere 31 and a spherical socket 32 that mates and is rotatably coupled to the sphere 31. The sphere 31 is connected to the distal end of the coupling screw rod 13 of the first suction cup assembly 1. The spherical socket 32 is connected to the distal end of the coupling screw rod 23 of the second suction cup assembly 2.

As shown in FIG. 3, the distal end of the coupling screw rod 13 of the first suction cup assembly 1 is provided with a pin hole 131 extending therethrough. The sphere 31 is provided with a bore 311 for fitting the sphere to the distal end of the coupling screw rod and a pin hole 312. The two pin holes 131, 312 are set in alignment with each other to receive a pin to extend therethrough for coupling thereby the sphere 31 is pivotally connected by the pin to the coupling screw rod 13 of the first suction cup assembly 1.

As shown in FIG. 3, the spherical socket 32 comprises a first spherical socket member 321 that is coupled to the distal end threading of the coupling screw rod 23 of the second suction cup assembly 2 and a second spherical socket member 322 that is fit over an outer circumference of the first spherical socket member 321. The first spherical socket member 321 has a front end forming an external thread and the second spherical socket member 322 has a rear end forming therein an internal thread so that the first spherical socket member 321 and the second spherical socket member 322 are threadingly coupled to each other. The first spherical socket member 321, when mating and coupled to the second spherical socket member 322, defines therein a cavity having an inside surface that is a spherical surface corresponding to and matching the sphere 31.

The operation of the rotatable multi-cup suction device according to the present invention will be described (by taking a car-carrying satellite navigation device as an example for illustration):

(1) The cup body 21 of the second suction cup assembly 2 is first affixed to an adhered surface, such as a car windshield; and (2) The satellite navigation device is then attached to the cup body 11 of the first suction cup assembly 1, whereby adjustment of the orientation of the first suction cup assembly 1 and the navigation device attached thereto can be made through the rotatable connection assembly 3 so that the operation and use is easy and convenient.

In the above, the present invention is illustrated and explained with an example of dual-cup suction device. However, it is appreciated that the number of the suction cups that are combined in the suction device can be varied as desired by simply modifying the rotatable connection assembly in such a way to adapt to such a desired arrangement of multiple suction cups.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rotatable multi-cup suction device, characterized in that: the suction device comprises at least two suction cup assemblies, the suction cup assemblies being coupled to each other through a rotatable connection assembly, the suction cup assemblies each comprising a cup body that is adapted to directly contact an adhered surface of an object, the cup bodies being each provided with a cap positioned thereon to define a cavity with the cup body, each of the cup bodies comprising a coupling screw rod, each of the caps comprising a mounting hole formed in a central portion thereof to receive the coupling screw rod to extend therethrough, each of the caps being provided, on a top thereof, with a rotary knob that is threadingly coupled to the coupling screw rod, each of the cup bodies being provided with an air evacuation hole that is adapted to communicate with an air evacuation device, each of the coupling screw rod having a distal end of which a length extends beyond an end face of the rotary knob, each of the cup bodies having a bottom in which a full turn of an annular groove is formed and each of the cup bodies has a top on which a raised curved wall that defines therein a cavity is formed so that the cavity defined by the raised curved wall is in communication with a cavity defined in the bottom annular groove, the air evacuation holes being arranged on the raised curved walls, respectively, the suction cup assemblies being of a number of two, which are respectively a first suction cup assembly and a second suction cup assembly, and the rotatable connection assembly comprising a sphere and a spherical socket that mates and being rotatably coupled to the sphere, the sphere being connected to the distal end of the coupling screw rod of the first suction cup assembly, the spherical socket being connected to the distal end of the coupling screw rod of the second suction cup assembly, the distal end of the coupling screw rod of the first suction cup assembly being provided with a pin hole extending therethrough, the sphere being provided with a bore for fitting the sphere to the distal end of the coupling screw rod of the first suction cup assembly and a pin hole, the two pin holes being alignable with each other to receive a pin to extend therethrough so as to connect the sphere to the coupling screw rod of the first suction cup assembly, the spherical socket comprising a first spherical socket member that is coupled to a distal end threading of the coupling screw rod of the second suction cup assembly and a second spherical socket member that is fit over an outer circumference of the first spherical socket member, the first spherical socket member having a front end forming an external thread and the second spherical socket member having a rear end forming therein an internal thread so that the first spherical socket member and the second spherical socket member are threadingly coupled to each other, whereby the first spherical socket member, when mating and coupled to the second spherical socket member, defines therein a cavity having an inside surface that is a spherical surface.

* * * * *